United States Patent [19]
Lucas

[11] Patent Number: 5,804,717
[45] Date of Patent: Sep. 8, 1998

[54] MASS FLOW TRANSDUCER HAVING EXTENDED FLOW RATE MEASUREMENT RANGE

[75] Inventor: Paul D. Lucas, Melrose, Mass.

[73] Assignee: MKS Instruments, Inc., Andover, Mass.

[21] Appl. No.: 628,196

[22] Filed: Apr. 5, 1996

[51] Int. Cl.⁶ .................................................. G01F 5/00
[52] U.S. Cl. ............................................................ 73/202
[58] Field of Search .................................... 73/202, 202.5, 73/204.21, 204.22, 861.52, 861.65, 197

[56] References Cited

U.S. PATENT DOCUMENTS

| | | |
|---|---|---|
| 3,433,068 | 3/1969 | Werner et al. . |
| 3,559,482 | 2/1971 | Baker et al. ............................... 73/202 |
| 3,613,448 | 10/1971 | Benson et al. . |
| 3,851,526 | 12/1974 | Drexel . |
| 3,938,384 | 2/1976 | Blair . |
| 4,418,723 | 12/1983 | Koni et al. ........................... 73/861.52 |
| 4,464,932 | 8/1984 | Ewing et al. . |
| 4,522,058 | 6/1985 | Ewing . |
| 4,548,075 | 10/1985 | Mariano . |
| 4,571,801 | 2/1986 | Ewing . |
| 4,624,138 | 11/1986 | Ono et al. . |
| 4,800,754 | 1/1989 | Korpi ........................................ 73/202 |
| 4,877,051 | 10/1989 | Day . |
| 4,984,460 | 1/1991 | Isoda . |
| 5,090,240 | 2/1992 | Baker et al. .............................. 73/197 |
| 5,142,907 | 9/1992 | Hinkle . |
| 5,295,394 | 3/1994 | Suzuki ..................................... 73/202 |
| 5,332,005 | 7/1994 | Baan ........................................ 73/202 |
| 5,461,913 | 10/1995 | Hinkle et al. . |

*Primary Examiner*—George Dombroske
*Assistant Examiner*—Harshad Patel
*Attorney, Agent, or Firm*—Lappin & Kusmer LLP

[57] ABSTRACT

A multi-channel mass flow transducer has a single laminar flow element in a primary fluid flow path and multiple secondary flow paths in parallel with and in fluid communication with the primary flow path. Flow restriction elements are disposed in one or more of the secondary flow paths to establish different flow rate measurement "channels" having particular flow rate ranges. The multi-channel transducer of the present invention is capable of measuring fluid flow rates over an extended range and eliminates the need for multiple transducers to measure varying fluid flows.

17 Claims, 4 Drawing Sheets

MASS FLOW TRANSDUCER HAVING EXTENDED FLOW RATE MEASUREMENT RANGE

FIELD OF INVENTION

The present invention relates generally to mass flow transducers for measuring the flow rate of a fluid in a conduit. More particularly, the invention relates to mass flow transducers which are capable of measuring the rate of fluid flow over a relatively wide range of flow rates.

BACKGROUND OF THE INVENTION

Mass flow transducers are typically used to measure the flow rate of a fluid through a conduit. Thermal mass flow transducers which employ one or more temperature-sensitive resistance elements in thermal communication with the fluid conduit and provide an electrical output signal are known. Such transducers operate on the principle that the rate of heat transfer to a fluid (i.e., a liquid or a gas) passing through a laminar flow channel from the walls of the channel is a relatively simple function of the temperature difference between the fluid and the channel walls, the specific heat of the fluid, and the mass flow rate of the fluid within the channel. Since the specific heat of a fluid does not vary greatly with pressure or temperature, a thermal mass flow transducer which is calibrated for a particular fluid will give true mass flow rate readings over a wide range of operating conditions.

Thermal mass flow transducers therefore include one or more heating elements which transfer energy to a fluid flowing in a small laminar flow tube, usually having a cross-section of capillary size dimensions and sometimes referred to as a sensor tube. The sensor tube typically includes a capillary tube having an input and output in fluid connection, respectively, with an upstream and downstream location of the main conduit for transporting the fluid. The capillary tube has internal dimensions so as to insure laminar flow of the fluid through the capillary tube. A bypass or laminar flow element is typically disposed in the main conduit between the input and output of the sensor tube to insure laminar flow through the bypass section of the main conduit up to a maximum designed flow rate (beyond which the flow becomes non-laminar), so that the ratio of fluid flow through the capillary tube and the bypass will always be constant throughout the entire measurable range of rate of laminar flow. The ratio is determined, in part, by the difference in pressure or pressure drop provided by the secondary flow path, hereinafter referred to as to the "$\Delta P$ characteristic." Unfortunately, the sensor used to sense the flow through the sensor tube is linear through a smaller range of flow rates than the range through which laminar flow through both the sensor tube and bypass section can be achieved. For example, the capillary tube may be designed to provide a range of flow rates with a minimum of 1 standard cubic centimeter per minute (sccm) and a maximum flow rate of 10 sccm, when the flow rate through the bypass element is designed to provide a flow rate of between 50 and 500 sccm, respectively, beyond the limits of which the sensor becomes non-linear. The measurement ratio between the flow rate in the bypass and the flow rate in the sensor tube is therefore 50:1 throughout the linear range of measurement between about 50 sccm and about 500 sccm, and the sensor can be calibrated to that range accordingly. The bypass element, however, may be capable of maintaining laminar flow for rates up to 15,000 sccm or higher. Thus, if a different sensor tube is used with a different $\Delta P$ characteristic, for example, so that the linear range of measurement of the sensor tube occurs between a flow rate range of 1 sccm and 10 sccm through the sensor tube with corresponding flow rates of between 500 sccm and 5000 sccm, the resulting measurement ratio becomes 500:1. Thus, while the ratio is constant throughout the entire range of flow rates which are within the linear range of the sensor, the actual ratio can vary as a design choice and will determine the linear range of the transducer.

The heating or thermal elements used to provide energy to the capillary tube are usually made of a metal alloy having a high resistance and a high temperature coefficient of resistance. The elements are wound tightly around the outside of the sensor tube to provide effective heat transfer to and from the fluid without disturbing the fluid flow within the tube. The high temperature coefficient of resistance makes these heating elements very good devices for sensing the temperature of the tube, as well as for heating the tube and fluid flowing therein, and they are often employed in this double capacity. Such heating elements are described, for example, in U.S. Pat. Nos. 4,464,932 to Ewing and 4,984,460 to Isoda.

Mass flow transducers which use one or more thermal elements in thermal communication with the sensor tube are known. Generally, the thermal elements measure the temperature gradient of a gas flowing through the sensor tube. The thermal elements form part of an electrical bridge circuit which includes standard resistance elements in addition to the thermal resistance elements previously mentioned. Fluid flowing through the conduit cools the upstream resistance elements relative to the downstream elements and causes a change in resistance, which affects the voltage in the bridge circuit. An electrical signal representative of the voltage difference, and thus the mass flow rate, is generated. This signal can be used, for example, to control a valve to adjust the fluid flow through the conduit. But, as described above, the signal is linear and related to mass flow in the sensor tube only through a predetermined range of flow rates.

In fluid flow applications in which the fluid flow rate varies widely, i.e., wider than the range provided by any single transducer, it is often necessary to employ several mass flow transducers in the fluid line, each transducer having its own flow rate measurement range, in order to determine the mass flow rate of the fluid. Because space for components in a fluid flow system is often quite limited, the use of several mass flow transducers, with their attendant individual controls, is costly, bulky, and often not feasible.

It would therefore be an advantage to provide a single mass flow transducer which is capable of measuring fluid flow throughout an extended flow rate range.

OBJECTS OF THE INVENTION

A general object of the present invention is therefore to reduce or substantially overcome the above-noted disadvantages of the prior art.

A more specific object of the invention is to provide a single mass flow transducer which measures the flow rate of a fluid over a range of flow rates relatively wider than the range measured by the above-described prior art transducers, and is thus more versatile than these prior art mass flow transducers.

And another object of the invention is to provide a mass flow transducer which employs multiple secondary fluid flow sensor paths in parallel and in fluid communication with a single primary flow path.

And yet another object of the invention is to provide a mass flow transducer in which each secondary fluid flow sensor path is associated with a unique fluid flow rate measurement range.

And still another object of the invention is to provide a mass flow transducer in which each of the secondary fluid flow sensor paths corresponds to a particular range of flow rate measurements such that the different flow rate ranges are either continuous or discontinuous over a relatively wide range of flow rates.

And yet another object of the invention is to provide a mass flow transducer in which the flow rate measurement ranges of each of the secondary fluid flow sensor paths can be further modified by using a flow restricting element in one or more of the secondary flow paths.

SUMMARY OF THE INVENTION

These and other objects of the invention are achieved by a mass flow transducer for measuring the rate of flow of a fluid through the transducer. The transducer comprises a housing, means for defining a primary fluid flow path, preferably the bypass, and means for defining at least two separate secondary fluid flow paths, preferably both sensor paths, in fluid connection with the primary (bypass) fluid flow path. Each of the secondary fluid flow paths is designed so as to provide with the primary fluid flow path a different measurable range of fluid flow rates through the transducer. Specifically, each secondary fluid flow path is designed so as to provide with the primary fluid flow path a different ratio of measurable flow rates. This is preferably accomplished by providing each secondary fluid flow path with a different $\Delta P$ characteristic relative to that of the primary flow path, as, for example, by providing each secondary flow path with a different length, a different internal dimension(s), or by using a flow restricting element, as mentioned below. Coupled to each of the secondary flow paths is a measuring circuit for measuring the fluid flow rate throughout the corresponding range of flow rates, preferably as a function of the temperature of the fluid flowing in each of the secondary flow paths.

A flow controlling (bypass) element in the primary fluid flow path provides for substantially laminar fluid flow therein. The laminar flow element establishes at least one laminar flow channel in the primary flow path. In one embodiment, the laminar flow channel is in the form of a cylindrical flow path around the element. In another embodiment, a helical laminar flow path is created. Other laminar flow channel configurations are also possible.

Each secondary flow path corresponds to a different flow rate measurement range. In one embodiment, the flow rate ranges of the secondary flow paths are continuous so that they provide an extended, uninterrupted range of flow rates that can be measured by the transducer. In another embodiment, the flow rate ranges of the secondary flow paths are discontinuous and do not overlap.

In addition, the $\Delta P$ characteristics of the secondary flow paths relative to that of the primary flow path can be different, for example, by making the secondary flow paths of different path lengths, each path length corresponding to a different range of flow rates for fluid flow in the primary flow path. Alternatively or in addition, the $\Delta P$ characteristics of one or more of the secondary flow paths can be modified by the insertion therein of at least one flow restricting element for modifying the flow rate in the respective flow path so that each secondary flow path is used for measurement of a different range of flow rates for fluid flow in the primary flow path. In the latter instance, the flow restricting element is preferably a fluid-permeable member disposed in a secondary flow path. The range of flow rates in a secondary flow path in which a flow restricting element is placed is a function of the fluid permeability of the element or elements in that path.

In one embodiment, the secondary flow paths are arranged to be in parallel with one another. In this instance the inputs of the secondary flow paths can be connected to the same upstream location of the primary flow path, the outputs can be connected to the same downstream location of the primary flow path, and/or at least a portion of each secondary flow path is disposed parallel to the same section of the primary flow path. In another embodiment, the secondary flow paths are arranged in seriatim so that the portion of each secondary flow path parallel to the primary flow path is disposed parallel to a different section of the primary flow path, so that the input and output of one secondary flow path are disposed downstream from the input and output of another secondary flow path.

Means are also preferably provided for measuring the flow rate in the transducer. The measuring means preferably includes means associated with each of the secondary flow paths for measuring the flow rate in that path. The measuring means preferably includes at least one temperature-responsive element which is in thermal communication with the fluid flowing in the corresponding secondary flow path and which measures the temperature of the fluid in that path. The fluid flow rate in each secondary flow path is a function of the temperature of the fluid in that path. The measuring means also includes means for providing a signal representative of the fluid flow rate through the corresponding flow path as a function of, and in response to, the measured temperatures of the fluid flows in the secondary flow path, which is proportional to the flow rate through the combined primary and secondary flow paths.

According to another aspect of the invention, there is provided a mass flow transducer which has a primary fluid flow path and at least one secondary flow path disposed in parallel and in fluid communication with the primary fluid flow path. Fluid flow in the primary flow path within the range of flow rates associated with the secondary flow path establishes fluid flow in the secondary flow path at a rate which varies in relation to and as a function of the flow rate in the primary flow path. The mass flow transducer further includes one or more flow resistance elements which determine the range of flow rates associated with the primary and secondary flow paths. In the case where the transducer includes at least two secondary fluid paths, the flow resistance element is a fluid-permeable member disposed in at least one of the secondary flow paths so as to modify the $\Delta P$ characteristics of that secondary flow path relative to the primary flow path.

These and other objects and advantages of the invention will in part be obvious and will in part appear hereinafter. The invention accordingly comprises the apparatus possessing the construction, combination of elements and arrangement of parts which are exemplified in the following detailed disclosure, the scope of which will be indicated in the claims.

BRIEF DESCRIPTION OF THE DRAWINGS

For a fuller understanding of the nature and objects of the present invention, reference should be had to the following detailed description taken in connection with the accompanying drawings, in which.

DETAILED DESCRIPTION OF THE DRAWINGS

The mass flow transducer of the present invention comprises a single primary fluid flow path and at least two secondary fluid flow paths in parallel with the primary fluid flow path so that the fluid flowing through the transducer is the combined fluid flowing through the primary and secondary flow paths. Fluid flow in the primary flow path can be measured over the flow rate range(s) which are defined by the combined flow rate measurement ranges of the respective secondary flow paths. The ΔP characteristics of the secondary paths are preferably different from one another, e.g., flow restricting elements are used in one or more of the secondary flow paths, and/or the internal dimensions of the sensor tubes are different, and/or the path lengths of the secondary flow path lengths are different, so as to extend the limits of the flow rate measurement range of the transducer. In this way, a single, highly compact flow measurement device can be used to measure a relatively wider range of flow rates than can be achieved by the transducers using a single primary flow path and a single secondary flow path as described above.

Figure 1:
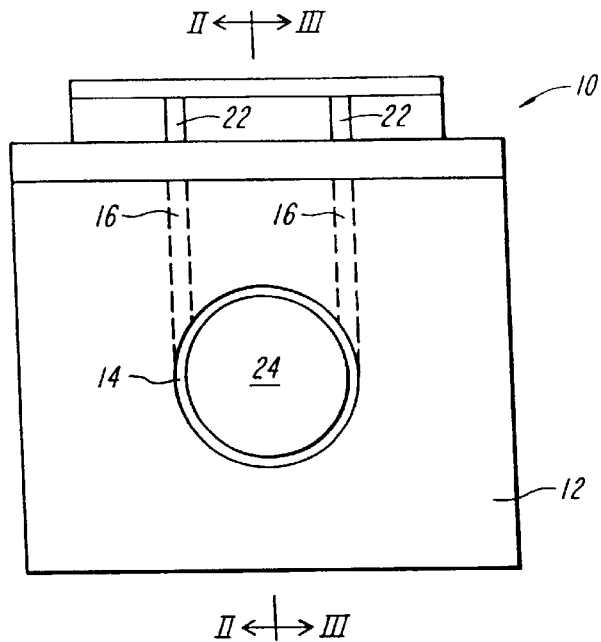
FIG. 1 is an end view of a mass flow transducer according to one aspect of the present invention.
Figure 2:
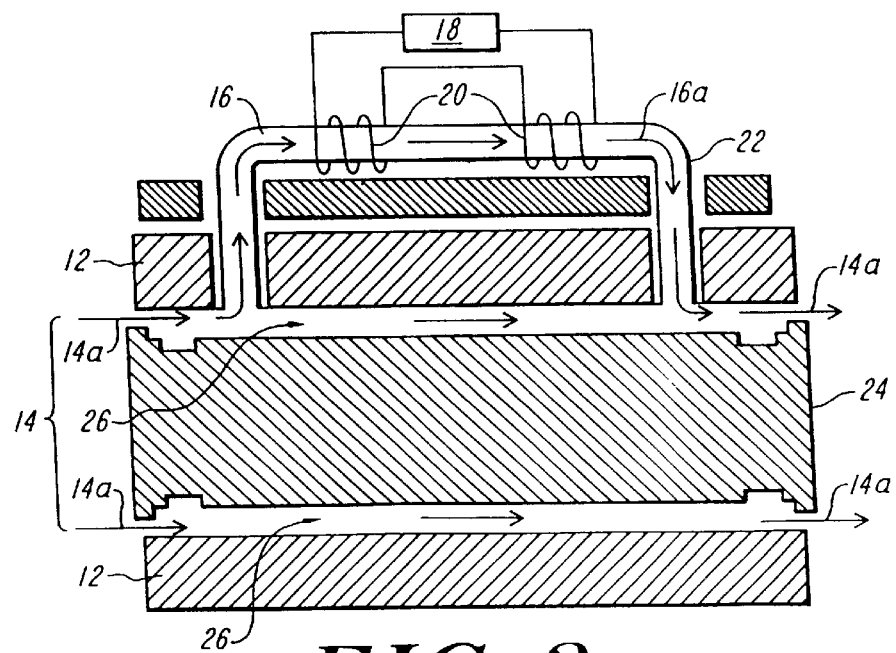
FIG. 2 is a side sectional view of the mass flow transducer of FIG. 1, taken along section lines II—II, showing a primary fluid flow path and a secondary fluid flow path in parallel with the primary flow path.
Figure 3:
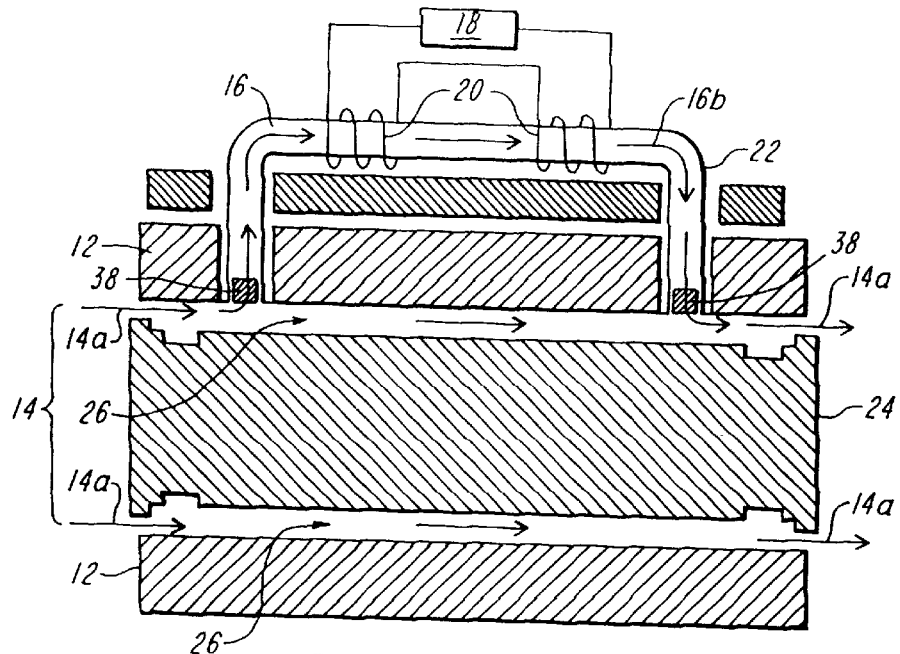
FIG. 3 is a side sectional view of the transducer of FIG. 1, taken along section lines III—III and modified in accordance with one aspect of the present invention, showing another secondary fluid flow path, including a pair of flow restriction elements therein, in parallel with the primary flow path.

A preferred embodiment of the mass flow transducer is shown at 10 in FIG. 1 and in greater detail in FIGS. 2 and 3. The transducer 10 includes a housing 12 which defines a primary fluid flow path 14, as shown by arrows 14a in FIGS. 2 and 3, and at least two secondary flow paths 16, as shown by arrows 16a in FIG. 2 and 16b in FIG. 3. As shown best in FIGS. 2 and 3, a major portion of each of the secondary flow paths 16 is in parallel with, and in fluid communication with, the primary flow path 14, the secondary flow paths being generally in parallel with one another.

The housing 12 is generally compact in size, measuring typically about 1" by 1" by 2" in length. The primary flow path 14 is generally cylindrical, although it can be of any shape and size that will accommodate the fluid flowing therethrough.

Each of the secondary flow paths 16 has a portion of a measuring circuit 18 associated with it. For a predetermined range(s) of flow rates the measuring circuit 18 measures the temperature of the fluid flowing in each secondary flow path and thereby determines the fluid flow rate through the primary flow path 14 and the secondary flow paths 16, as will be more fully detailed below. The measuring circuit 18 is coupled to the secondary fluid flow paths 16 so that temperature changes in the fluid flowing in the secondary flow paths are detected by one or more thermal elements 20 wound around the outside of the sensor tubes 22 which define the secondary flow paths 16. The thermal elements also add heat to the fluid in the sensor tubes in response to such temperature changes.

The measuring circuit 18 is typically an electrical bridge circuit associated with each one of the secondary flow paths. The bridge circuit typically includes at least one temperature-sensitive resistance element 20, and preferably two or more such elements, which are wound around the corresponding sensor tubes 22 and are in thermal communication with the fluid in the respective secondary flow paths. The temperature of the fluid in a given secondary flow path is detected by the temperature-sensitive resistance element or elements associated with that flow path, and the change in resistance of the temperature-sensitive resistance element or elements is an indication of the flow rate of the fluid through that path. An electrical signal representative of the fluid flow rate through that path is generated by the bridge circuit, the signal varying in relation to, and as a function of, the temperature of the fluid as measured by the temperature-sensitive resistance elements. Typically, this signal varies as a linear function of the temperature of the fluid, but only for a limited range of flow rates.

A laminar flow element 24 is disposed in the primary flow path 14 so as to provide substantially laminar flow in the primary flow path, the path 14 thereby functioning as a bypass. Laminar flow is defined as smooth and steady fluid flow in which all fluid velocities and pressures have well-defined profiles across a section of the flow. In contrast, turbulent flow is defined as agitated fluid flow in which local fluid velocities and pressures fluctuate irregularly across a section of the flow. Flowing fluids can be characterized by a dimensionless number, known as the Reynolds number, which is expressed as the ratio of the product of the fluid density, its velocity, and a characteristic flow length to the fluid viscosity. The Reynolds number of a fluid is typically less than about 2000 for laminar flow and greater than about 3000 for turbulent flow. In the transducer of the present invention, the laminar flow element 24 is selected to ensure that only laminar flow is established in the primary flow path and that the relationship between the mass flow rate of the fluid and the pressure drop of the fluid over the length of the measurement path is linear.

Figure 4A:
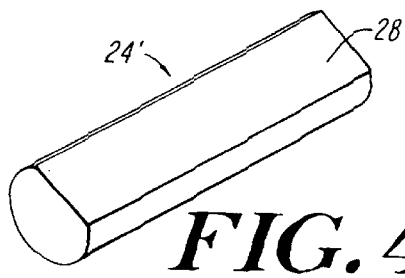
FIGS. 4A–4E are perspective views of various embodiments of a laminar flow element useful in the present invention.
Figure 4B:
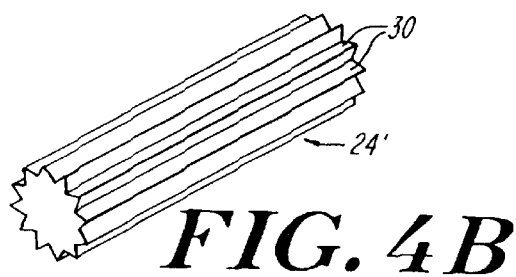
Figure 4C:
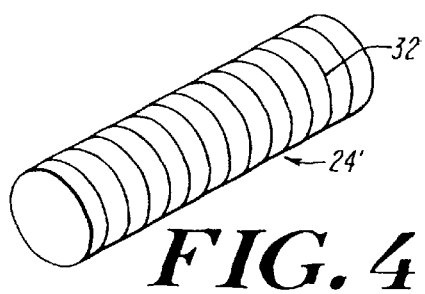
Figure 4D:
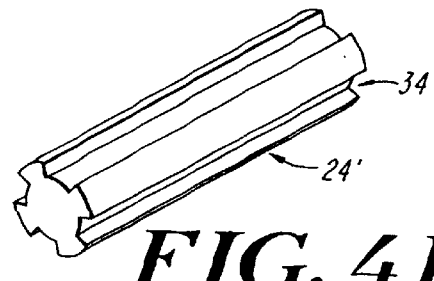
Figure 4E:
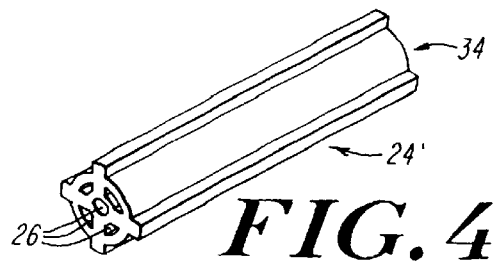

The laminar flow element 24 defines at least one laminar flow channel 26 in the primary flow path 14. Differences in the diameter and configuration of the laminar flow element creates different laminar flow ranges. As shown in greater detail in FIGS. 4A–4E, the laminar flow element can be of a wide variety of shapes and configurations, all designed to provide one or more laminar flow channels in the primary flow path. In FIG. 4A a generally cylindrical laminar flow element 24' has a flat portion 28 extending along at least one side of the element. In a housing defining a generally cylindrical flow path in which a cylindrical laminar flow element can be installed, such as that shown in FIG. 1, the laminar flow channel created around the laminar flow element will be an annulus having a somewhat thicker portion in the region of the flat 28. In FIG. 4B a laminar flow element 24' having a star-shaped cross-section creates a plurality of laminar flow channels in the grooves 30 of the element. As shown in FIG. 4C, a helical flow path can be established around a laminar flow element having spiral channels 32 wound around the element. In FIG. 4D is shown a variant of the star-shaped flow element of FIG. 4B, in which the laminar flow channels 34 are relatively large in cross-sectional area. FIG. 4E illustrates a laminar flow element which is similar to that shown in FIG. 4D. Channels 34 extend along the exterior of the element and provide laminar flow around the flow element, while interior channels 36 also provide substantially laminar fluid flow through the element.

Each secondary flow path 16 corresponds to a particular flow rate range for the fluid flowing in the transducer for which the circuit 18 provides a linear response. The different ranges can be continuous, or overlapping, so that the aggregate measurement range of the transducer defined by the individual ranges of the respective secondary flow paths is a continuous, uninterrupted range of flow rate measurements. Alternatively, the secondary flow paths can define individual flow rate ranges which do not overlap with one another, so that the aggregate measurement range of the transducer is a series of discrete flow rate ranges at which the measuring circuit 18 is a linear function of measured temperature.

Figure 5:
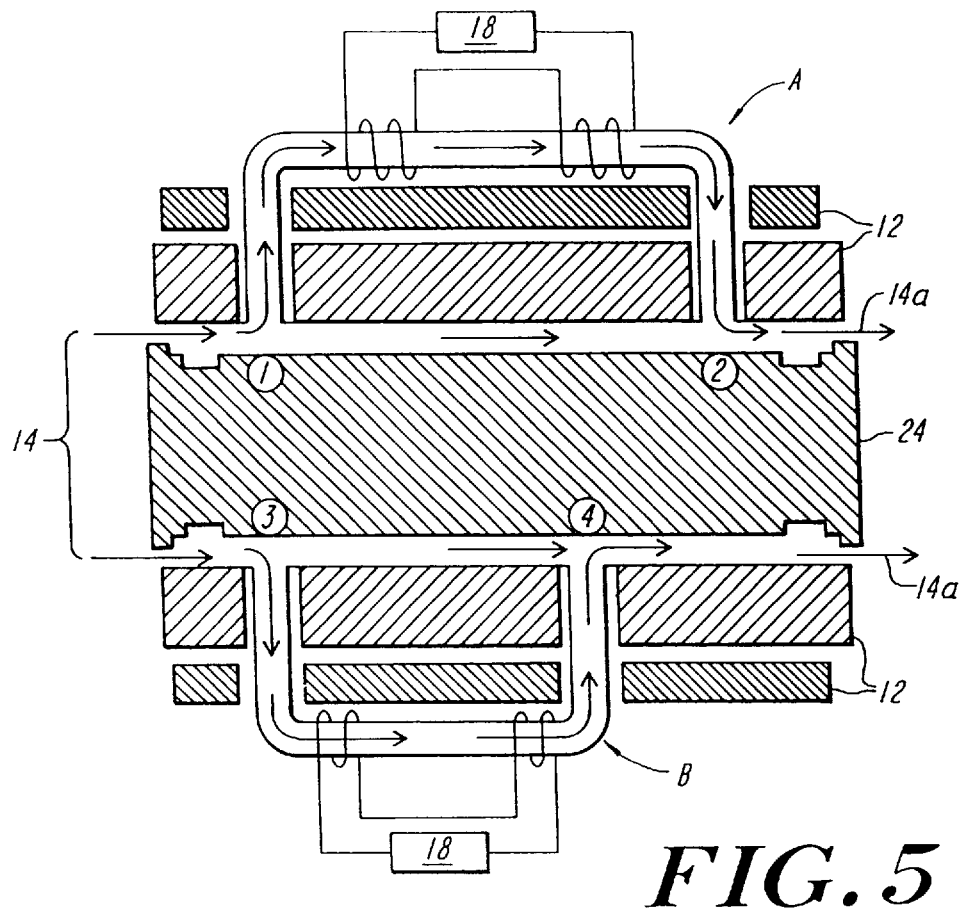
FIG. 5 is a side sectional view of a mass flow transducer, modified according to at least one other aspect of the present invention, in which two secondary flow paths have unequal path lengths.

In another embodiment, the ΔP characteristics of the secondary flow paths 16 can differ by making them of unequal lengths, as shown in FIG. 5. Secondary paths A and B are exposed to the same fluid flowing in the primary flow path. However, secondary path A at the top of FIG. 5 is associated with one particular flow rate range, which depends on the type of fluid, its velocity in the flow path, the length of the flow path (distance between points 1 and 2), and the pressure drop along the path. Secondary path B at the bottom of the FIGURE is associated with a different flow rate range, because its path length between points 3 and 4 is substantially shorter than that of secondary path A. As a result, for a given fluid flow in the primary path 14, the pressure drops along the respective secondary flow paths are different, and thus the ranges of flow rate measurement in the illustrated secondary flow paths A and B are different.

In yet another embodiment, the transducer 10 can include means for modifying the flow rate of a fluid in one or more of the secondary flow paths 16 so that the ΔP characteristics of the secondary flow paths are different so as to extend the limits of the range of the flow rate measurement capability of the transducer. For example, the transducer can be configured so that each of the secondary flow paths is equal in length to the other secondary flow paths, as illustrated in FIGS. 2 and 3, with each configured with a different internal diameter of capillary size dimension. Alternatively, the flow rates in the secondary flow paths can be modified by the use of a flow restriction element 38 in at least one of the secondary flow paths, as shown in greater detail in FIG. 3. The flow restriction element 38 can be, for example, a fluid-permeable member, such as a screen or an otherwise porous member, which is disposed within a fluid flow path so that the fluid flowing in the path flows through the porous member as well. The flow restriction element 38 is generally designed to fit securely within the flow path and can be installed, for example, by press-fitting it into the flow channel. Note that the flow restriction element can be installed in either the primary or secondary flow paths. Laminar fluid flow can be established in the primary flow path with a flow restriction element in place of the laminar flow element.

Figure 6A:
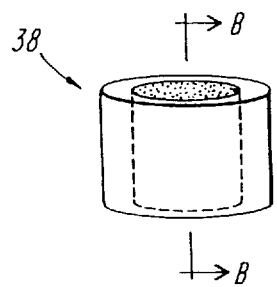
FIGS. 6A–6B are, respectively, perspective and sectional views of a flow restriction element shown in FIG. 3.
Figure 6B:
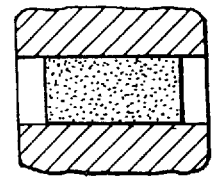

A preferred embodiment of the flow restriction element 38 is illustrated in FIG. 6 and can be obtained from the Mott Metallurgical Corporation, Industrial Division (Farmington, Conn.). These flow restriction elements are constructed of sintered metal alloy plugs which are assembled into standard sieves. The assembly is typically constructed of stainless steel.

A flow restriction element 38 in a particular secondary flow path 16 functions as a resistance to fluid flow in that flow path. It is therefore analogous to an electrical resistance in an electrical circuit, which causes a voltage drop proportional to the value of the resistance. As in an electrical circuit, all the fluid flowing in a secondary path 16 will flow through the flow restriction element or elements 38 in that path. The pressure drop across the element, i.e., its ΔP characteristics, and thus the fluid flow rate range of the secondary path in which the flow restriction element is disposed, is a function of the fluid permeability of the element. Note that multiple flow restriction elements can be installed in a single flow path, to the extent that space permits, as shown, for example, in FIG. 3, in order to increase the resistance to fluid flow in that path, thereby further extending the fluid flow rate measurement range of the transducer.

Figure 7:
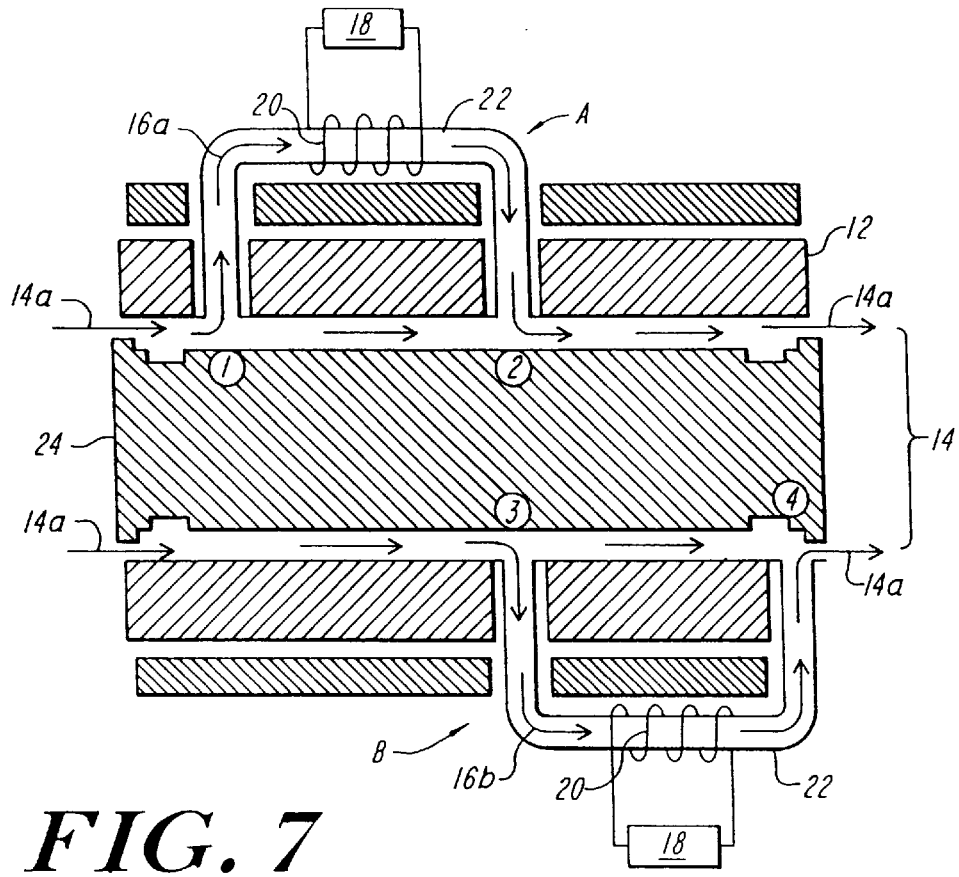
FIG. 7 is a side sectional view of a mass flow transducer, modified according to yet another object of the present invention, in which two secondary flow paths are arranged serially.

As shown in FIGS. 1 and 5, the secondary flow paths 16 are preferably arranged in parallel with one another, in addition to being arranged in parallel with the primary flow path 14. Alternatively, the secondary flow paths 16 can be arranged serially with one another and in parallel with the primary flow path 14, so that each secondary flow path is in parallel and in fluid communication with a unique portion of the primary flow path, as best illustrated in FIG. 7.

Figure 8:
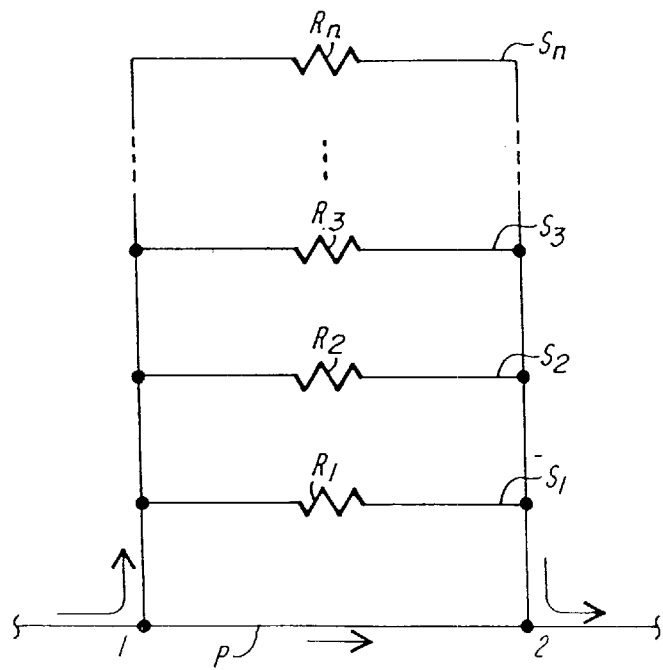
FIG. 8 is a schematic representation of the mass flow transducer of the present invention in order to illustrate the ΔP characteristics of a device made according to the principles of the present invention, in which a primary fluid flow path P and multiple secondary flow paths S are arranged in parallel with one another and with the primary flow path P, and in which each secondary flow path is associated with a flow resistance R which defines a particular flow rate range for that flow path.

FIG. 8 is a schematic illustration of the mass flow transducer of the present invention. A plurality of secondary flow paths $S_1, S_2, \ldots, S_n$, designated as item 16 in FIGS. 2 and 3, is disposed in parallel with the primary flow path P, designated as item 14 in FIGS. 2 and 3. Each secondary flow path has associated with it a characteristic resistance to fluid flow, designated as $R_1, R_2, \ldots, R_n$, which is provided by one or more flow restriction elements 38 disposed within one or more of the secondary flow paths. As in an electrical circuit, fluid flow at nodes 1 and 2 branches out to each of the parallel secondary flow paths S in inverse proportion to the resistance R in each pathway. The multiple parallel secondary flow paths S establish multiple flow rate measurement channels with characteristic flow rate ranges. The use of one or more flow restriction elements in one or more secondary flow paths can further extend the flow rate measurement range of the transducer, without requiring additional transducers in the fluid line. A single transducer thus becomes extremely versatile, as it can now be used to measure fluid flow over a relatively wide measurement range. For example, the multiple-channel transducer of the present invention includes a single laminar flow element 24, which provides a laminar fluid flow of from approximately 1 to 500 or more sccm, depending on the desired flow rate range in the primary fluid path. Fluid flowing at a velocity of, for example, 500 sccm and having a Reynolds number of approximately 30 can be measured by a "low" flow rate channel in the transducer, i.e., by a secondary flow path which has a relatively low resistance to fluid flow and is capable of measuring fluid flow in the range of approximately 0–500 sccm. Fluid flowing at a velocity of, for example, 15,000 sccm and having a Reynolds number of approximately 900 can be measured by a "high" flow rate channel, i.e., by a different secondary flow path which has a relatively high resistance to fluid flow, by virtue of one or more flow restriction elements in that secondary flow path, and is capable of measuring fluid flow in the range of approximately 500–15,000 sccm. Thus, the ratio of "high" to "low" flow rates that can be measured by a single transducer using the design of the present invention is, in this example, 30 to 1. Other "intermediate" flow rate channels can be established by designing secondary flow paths to include a particular number of flow restriction elements having a particular fluid permeability.

Because certain changes may be made in the above apparatus without departing from the scope of the invention herein disclosed, it is intended that all matter contained in the above description or shown in the accompanying drawings shall be interpreted in an illustrative and not a limiting sense.

What is claimed is:

1. A mass flow transducer for measuring the rate of flow of a fluid in a primary fluid flow path, said transducer comprising:

housing means including means for defining the primary fluid flow path;

means, coupled to said housing, for defining at least two secondary flow paths each for a corresponding and different measurable range of rates of flow of fluid in said primary fluid flow path, each of said secondary flow paths being disposed in parallel and in fluid communication with said primary fluid flow path so that fluid flow in said primary flow path within the measurable range of flow rates associated with one of said secondary flow paths causes fluid flow in that secondary flow path at a rate in relation to and as a function of the flow rate in said primary flow path; and means, coupled to each of said secondary flow paths, for measuring throughout the corresponding range of flow rates the rate of flow of fluid in said primary flow path as a function of the fluid flowing in each secondary flow path; wherein said means for defining at least two secondary flow paths includes means for defining the measurable range of rates of flow of fluid in each of the secondary flow paths so that each secondary flow path corresponds to a different measurable range of rates of flow of fluid in said primary fluid flow path, so as to provide an enhanced range of rates that can be measured by said transducer.

2. The transducer according to claim 1, wherein said means for defining said primary fluid flow path includes means for controlling the flow of fluid in said primary path so that the flow is substantially laminar.

3. The transducer according to claim 2, wherein said means for controlling the flow of fluid in said primary path so that the flow is substantially laminar includes a laminar flow element disposed in said primary path.

4. The transducer according to claim 3, wherein said laminar flow element includes means for establishing at least one laminar flow channel in said primary fluid flow path.

5. The transducer according to claim 3, wherein said laminar flow element includes means for establishing a cylindrical laminar flow path around said flow element.

6. The transducer according to claim 3, wherein said laminar flow element includes means for establishing a helical laminar flow path around said flow element.

7. The transducer according to claim 1, wherein said means for defining at least two secondary flow paths includes means for defining said flow paths so that each secondary flow path corresponds to a different range of rates of flow of fluid in said primary flow path such that the aggregate range defined by the at least two secondary flow paths is a continuous, uninterrupted range of flow rate measurements.

8. The transducer according to claim 1, wherein said means for defining at least two secondary flow paths includes means for defining said flow paths so that each secondary flow path corresponds to a different range of rates of flow of fluid in said primary flow path such that the aggregate range defined by the at least two secondary flow paths is a series of discrete and different flow rate measurement ranges which are discontinuous, separate from, and do not overlap with one another.

9. The transducer according to claim 1, wherein said means for defining at least two secondary flow paths includes means for defining a different path length for each of said secondary flow paths so that each secondary flow path corresponds to a different range of rates of flow of fluid in said primary fluid flow path.

10. The transducer according to claim 1, wherein said means for defining at least two secondary flow paths includes means for modifying the flow rate of fluid in at least one of the secondary flow paths so that each secondary flow path corresponds to a different range of rates of flow of fluid in said primary fluid flow path.

11. The transducer according to claim 10, wherein the means for defining the secondary flow paths includes means for defining the same path length for each of said secondary flow paths.

12. The transducer according to claim 10, wherein said means for modifying the flow rate of fluid includes flow restriction means.

13. A transducer according to claim 12, wherein said flow restriction means comprises at least one fluid-permeable member disposed within said secondary path.

14. A mass flow transducer according to claim 13, wherein said range of flow rates is a function of the fluid permeability of said fluid permeable member.

15. A transducer according to claim 1, wherein said secondary paths are arranged in parallel with each other.

16. A transducer according to claim 1, wherein said secondary paths are arranged in seriatim so that each of said secondary paths is disposed in parallel with and in fluid communication with a unique point in the primary fluid flow path.

17. A transducer according to claim 1, wherein said means coupled to each of said secondary flow paths for measuring the rate of flow in said primary flow path throughout the corresponding range of flow rates comprises an electrical circuit associated with each of said secondary flow paths, each of said circuits including at least one temperature-responsive element in thermal communication with the fluid in the corresponding secondary flow path such that the rate of fluid flow in the corresponding secondary flow path is a function of the temperature measured by said element, and means for providing an electrical signal representative of the rate of fluid flow in the primary fluid path as a function of and in response to said measured temperature.

* * * * *